Feb. 26, 1935. H. H. TOBIN 1,992,586
DIRT TRAP FOR GAS DISTRIBUTING LINES
Filed Dec. 8, 1931 2 Sheets-Sheet 1
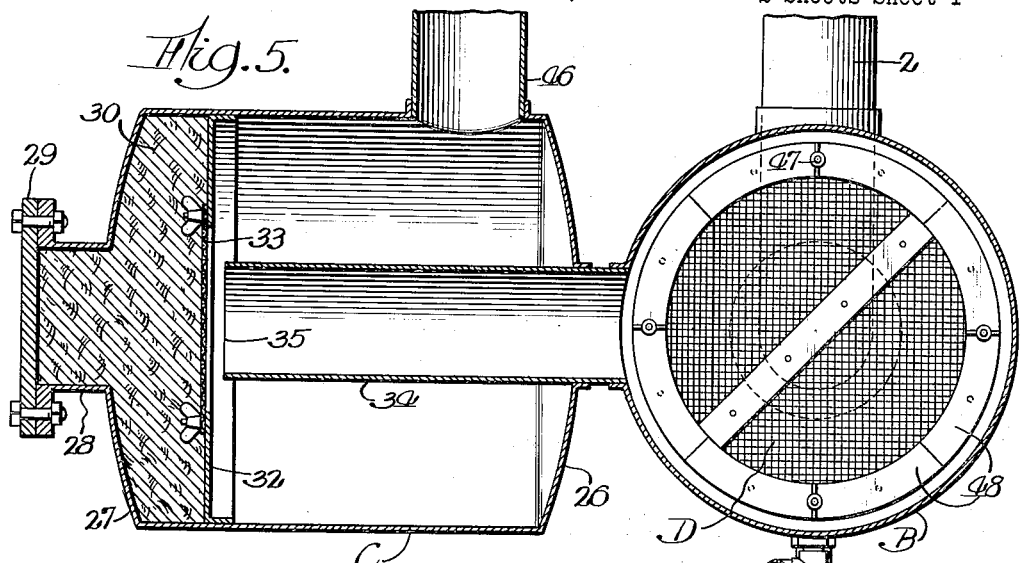
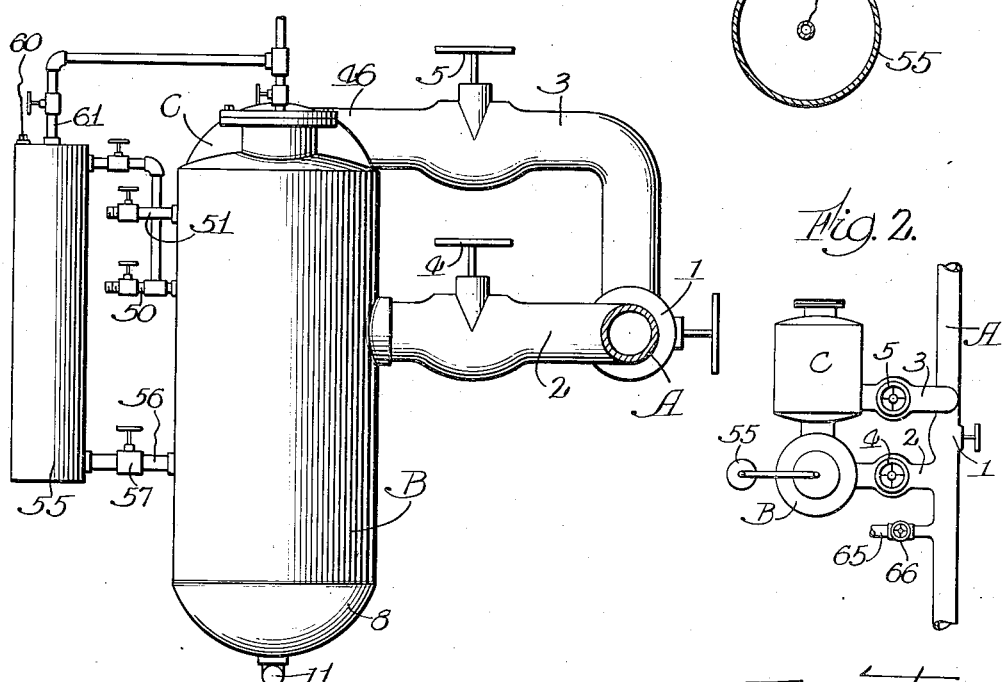
Inventor,
Harold H. Tobin
By George I. Haight Atty.

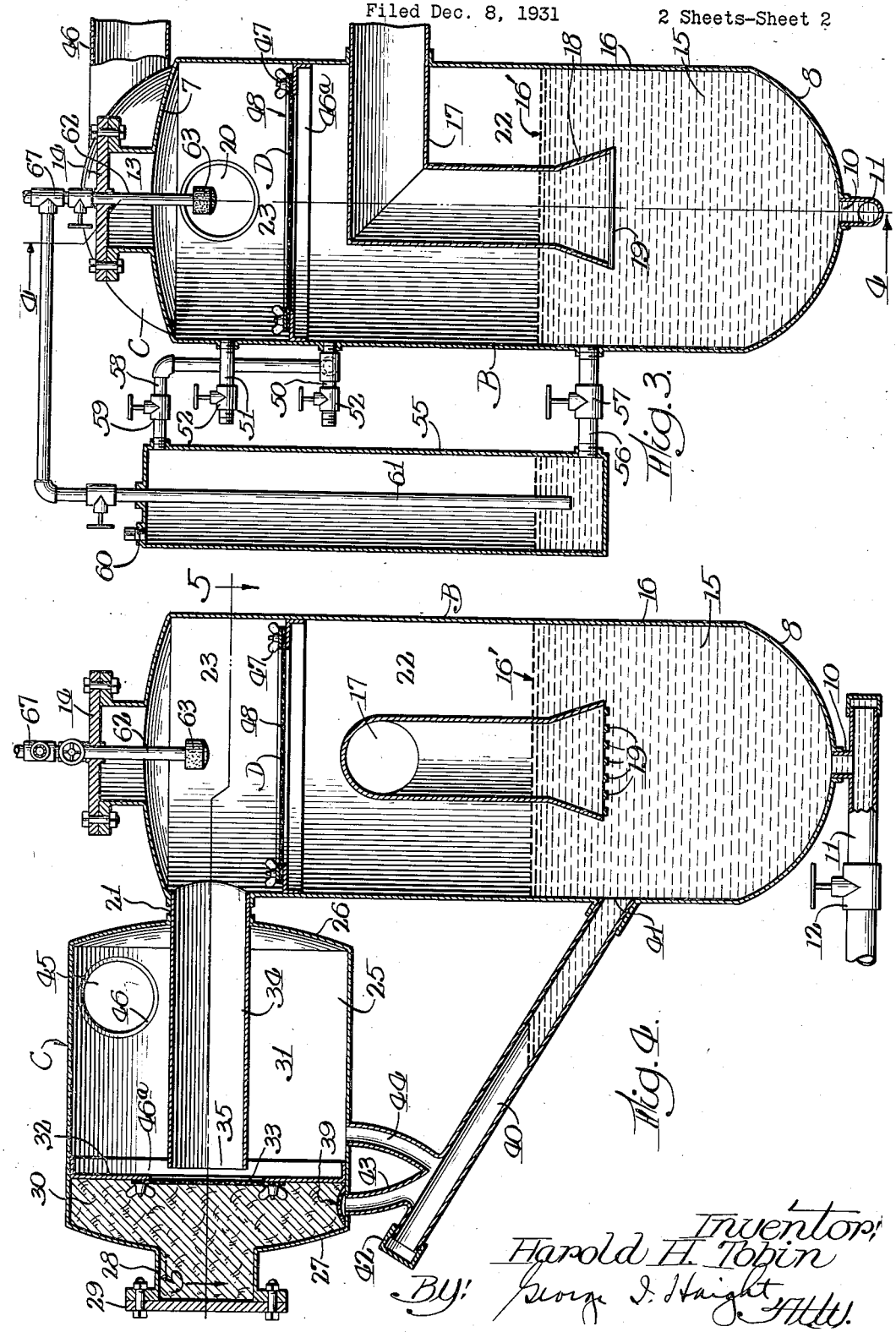

Patented Feb. 26, 1935

1,992,586

UNITED STATES PATENT OFFICE 1,992,586

DIRT TRAP FOR GAS-DISTRIBUTING LINES

Harold H. Tobin, Aurora, Ill.

Application December 8, 1931, Serial No. 579,740

10 Claims. (Cl. 183—14)

This invention relates to an improved dirt trap for gas-distributing lines.

Gas, both natural and manufactured, which is used for domestic and industrial purposes and is distributed in mains or pipe lines, always carries impurities such as dust, tar and other volatile substances which clog governors, regulators and gas-consuming appliances and which makes necessary continual and repeated service of this equipment at great cost.

In low pressure systems of distribution wherein the gas flows at low speed, these impurities for the greater part separate out and deposit along the bottom of the pipe lines which are provided generally larger in size than would otherwise be necessary, in order to take care of these deposits.

With the advent of the present high pressure systems of distribution, however, the problem of overcoming the effects of these impurities becomes very serious because the gas flows at tremendous speed and the impurities are carried along the pipes and deposited on the working parts of governors, regulators and appliances to the extent that these mechanisms are rendered more or less inoperative and need to be frequently serviced.

My invention involves the trapping or separating out of these impurities from the gas at strategic points in the distribution lines, and I provide an improved mechanism arranged to be connected in the pipe line in such manner that the gas flows through means for separating or trapping the dirt and impurities from the gas.

My invention is illustrated in the accompanying drawings as being embodied in a structure which is designed to be installed in an underground pit in connection with high pressure distribution lines.

Referring to these drawings,

Fig. 1 is a view in elevation of a dirt trap structure shown in connected relation to a gas-distributing pipe line, the pipe line being shown in section;

Fig. 2 is a plan view of the pipe line and branches leading to the dirt trap;

Fig. 3 is an enlarged vertical section through the main separating tank and the associated filling and measuring tank;

Fig. 4 is a vertical section substantially on the line 4—4 of Fig. 3; and

Fig. 5 is a horizontal section on the line 5—5 of Fig. 4.

A portion of a pipe line A is illustrated as representative of a pipe line leading from a source of supply of gas to the point of consumption, these pipes being usually buried underground a suitable depth for the purpose. At the point where the dirt trap is to be installed a valve 1 is provided in the line so that the flow of gas through the pipe line can be diverted through the dirt trap and returned to the line. On each side of the valve a branch pipe is provided, the branch 2 forming the connection to the inlet of the trap and the branch 3 forming the connection from the outlet thereof. These branches are provided with valves 4 and 5, so that in conjunction with the valve 1 the trap may be cut into or out of service as desired for any purpose. The dirt trap is likewise preferably installed in an accessible underground pit alongside the pipe line and connected with the branch pipes.

The dirt trap includes a main tank or drum B and an auxiliary or secondary tank or drain C, both preferably cylindrical in form and disposed with their axes at substantially right angles to minimize the overall height of the structure. The main tank B comprises the cylindrical side wall 16, an upper head 7 and a lower head 8, these parts being made of steel with the heads welded to the cylinder to form an integral closed structure of proper strength for high pressure requirements. The lower head is deeply rounded to form a suitable well or sump for collecting the dirt and solid impurities which are separated out of the gas and which settle to the bottom of the tank. This lower head has a drain opening 10 connected to a drain pipe 11 having a valve 12, whereby the accumulation of dirt and the washing oil may be taken from the tank whenever desired. The upper head 7 has a central manhole 13 through which access to the tank may be gained when desired, the manhole being closed and sealed by a removable manhole cover 14.

The main tank is disposed in vertical position and contains a quantity of oil 15 for washing out the impurities as the gas passes through this body of oil. In the particular structure shown, the oil level 16' is preferably maintained high enough to provide a sufficient body of oil for the purpose, but enough below the screen to prevent too much of the oil being carried upwardly by the gas to the screen, as hereinafter described.

The gas enters the tank through the inlet pipe 17 in the side wall thereof, this pipe being connected to the inlet branch pipe 2. This inlet pipe extends horizontally to the center of the tank and then turns downwardly to a point well below the oil level, thus forming an oil seal whereby the incoming gas must pass into the body of oil and then bubble upwardly therethrough, in which process the solid and fluid impurities are separated out of the gas, the solid particles settling to the bottom sump of the tank, and the fluid, such as tar, being dissolved by or mixed with the oil and thereby retained. The lower end 18 of the inlet pipe is flared and provided with a series of bars or strips 19 for the purpose of breaking up the incoming stream of gas into finer streams to better disseminate the gas through the body of oil and more thoroughly bring the gas into contact therewith for washing purposes.

The gas leaves the tank through an outlet opening 20 in the side wall adjacent the upper head and passes through a pipe or conduit 21 leading from said outlet. Between the inlet and outlet there is a horizontally disposed screen partition D which divides the tank into upper and lower chambers or compartments 22 and 23. The screen is preferably of relatively fine mesh and serves to separate out any solid particles which may have escaped the washing process. These will be caught by the under side of the screen and fall to the oil surface. The more or less violent bubbling of the oil necessarily causes some of the oil to be carried upwardly with the gas in the chamber 22. Most of this oil will be caught by the screen and will drop back into the pool of oil at the bottom, this process being facilitated by the fact that the velocity of the gas in passing upwardly through the tank is very much reduced on account of the larger diameter of the tank relatively to that of the inlet pipe, hence there is less likelihood of the oil being forced through the screen.

Some oil, however, will be carried over with the gas as it leaves the upper compartment 23, and for this reason the auxiliary separator C is provided. This separator is in the form of a tank 25 similar to the main tank in the respect that it has a cylindrical side wall and curved heads 26 and 27 welded thereto. This auxiliary tank is shorter in length than the main tank and is preferably disposed substantially horizontally adjacent the upper end of the main tank for several reasons. One reason is that the overall height of the structure can thereby be made substantially no higher than the main tank which is an important consideration when the structure is installed in an underground pit. Another reason is that this arrangement is more convenient structurally in providing for the return of the separated oil to the main tank.

The auxiliary tank has a manhole 28 in its head 27, which manhole is sealed by a removable manhole cover 29, whereby access to the tank may be gained for any desired purpose. The auxiliary tank is divided into two compartments 30 and 31 by means of a partition wall 32 suitably fastened in place in any desired manner as by welding to the cylindrical wall. The partition has a central opening therein which is covered by a removable screen 33 adapted to form a baffle or deflector against which the gas is impinged.

The auxiliary tank has in its larger chamber 31 a centrally disposed duct or conduit 34 which extends through and is secured to the tank head 26. The outer end of this conduit is connected directly to the outlet port 20 of the upper compartment of the main tank, and the inner end 35, as shown more clearly in Fig. 4 is open and is positioned in relatively close proximity to the screen 33 so that the gas flowing through the conduit 34 will be impinged directly against said screen and will be diverted or deflected laterally into the larger compartment 31 of the auxiliary tank. The force of the impinging gas against the screen separates any remaining oil or fluid carried along by the gas from the main separator.

In order to accumulate this separated oil and cause its removal from the screen, the smaller compartment 30 of the tank may be filled with a suitable absorbent material such as waste. The oil separated from the gas is absorbed by the waste and drains downwardly therethrough to the lowermost portion of the tank from which it is returned to the main tank by means of the return pipe 40. This return pipe 40 is inclined downwardly at a considerable angle and its lower end is connected to a port 41 in the main tank at a point well below the level 16' of the body of oil in said main tank. The pipe is made straight so that it may be readily cleaned when desired, and its upper end is closed by a removable cap 42 for this purpose. The lowermost portion of the waste-containing compartment 30 of the auxiliary tank is connected by a short drain pipe 43 with the return pipe 40 to convey the oil from this compartment to the return pipe, and the drain opening leading to drain pipe 43 is covered with a guard 39 to prevent the waste from entering said pipe. In addition to this, the lowermost portion of the compartment 31 of the auxiliary separator is likewise provided with a drain pipe 44 communicating with the return pipe to drain into the return pipe any fluid which may be impinged against the walls of said compartment 31.

The compartment 31 of the auxiliary separator has an outlet port 45 which is connected by the pipe 46 to the branch 3 extending to the outgoing side of the main gas line, as hereinbefore described in connection with Figs. 1 and 2. The relation of the position of the auxiliary separator to the main separator, and the inlet and outlet connections to these separators and to the main gas line may be varied or arranged to suit the requirements of the particular installation and the conditions incident to such installation.

The partition walls in both the main and auxiliary separator may be of any suitable construction and mounted in any suitable way best adapted for the purpose. In the construction shown, the partition walls are made in the form of flat plates or rings having central openings of the desired size and having annular flanges 46ª which are secured to the interior cylindrical walls of the main and auxiliary tanks by welding or otherwise, the partition plates being preferably fastened in position before the heads of the tanks are put in place. The screens are preferably made of brass wire of suitable mesh and since they are flexible they may be inserted in or removed from the tanks through the manholes. They are clamped on the partition walls by the thumb nuts 47, a clamping ring 48 being provided for clamping the margins of the screens against the partition wall. The clamping rings are preferably made in sections so that they can be conveniently handled through the manholes in the tanks.

Structures of this character as before mentioned, are generally placed in underground pits which are made large enough for accessibility. The structures themselves, however, after having once been installed, cannot conveniently be disassembled or removed for the purposes of inspection and cleaning. For this reason, I make provision for complete inspection of the structure as well as for the measuring and renewing of oil and for the cleaning of the screens without the necessity of disassembling the structure or cutting it out of service to any extent greater than the mere manipulation of the valves in the branches and main gas line. In order to determine whether the screen in the main tank is clean, or has become clogged with dirt, I provide taps 50 and 51 leading into the compartments 22 and 23 of the main tank, one of these taps communicating with the tank on each side of the screen, as shown more clearly in Fig. 3. These taps are provided with valves 52 so they may be opened and closed at will whenever desired. They are arranged so that a pressure measuring instrument can be connected thereto to indicate the gas pressure in both of the compartments 22 and 23. If the screen is clean, there will exist no differentiation in pressure in the two compartments, but in the event that the screen is clogged so as to restrict the passage of gas therethrough, a drop in pressure will occur in the upper compartment 23 which will be readily detected by the measuring instrument. Normally the tap valves 52 will be closed. Provision also is made for cleaning the screen without the necessity of removing it, as will hereinafter be described.

A measuring and filling tank 55 of suitable diameter and length is positioned preferably alongside the main tank and its lower end is connected by means of a filling pipe 56 with the compartment 22 of the main tank, this connection being made as shown in Fig. 3 at a point well below the normal level 16' of the oil. This filling connection has a valve 57 so that communication with the main tank may be closed or opened as necessary. When the valve is open, the level of oil in the tank 55 will correspond to the level of oil in the main tank. The upper end of the tank 55 is likewise connected by a pressure equalizing pipe 58 to the compartment 22 of the main tank at a point well above the oil level. As a matter of convenience this equalizing pipe is connected to the lower tap 50 between its valve 52 and the tank. This equalizing pipe likewise has a valve 59 for opening or closing communication with the main tank. Normally, the valves 59 and 57 are closed, thereby cutting off communication with the measuring tank 55.

When it is desired to measure the level of oil in the main tank, the valves 57 and 59 are opened momentarily until the level in the tank 55 is equalized with that in the main tank, whereupon the valves 57 and 59 are closed and a gauge stick, with suitable graduations, is inserted in the tank 55 to obtain an indication on the gauge stick as to the level of oil. The upper head of the tank 55 has an opening 60 closed by a removable plug, through which the gauge stick can be inserted.

When it is desired to add more oil to the main tank, it is introduced into the measuring tank 55, through opening 60, while the valves 57 and 59 are closed. After the necessary quantity of oil has been introduced into the tank 55, the opening 60 is closed by its plug and the valves 57 and 59 are opened. The pressure in the tank 55 becomes equalized with that of the main tank and the added oil will flow into the main tank until the levels in both tanks are equal, whereupon the valves 57 and 59 are again closed. These operations can be carried out without disconnecting the structure from the main gas line or interfering with its continuous operation. No disassembling of the parts is necessary.

In the event that the screen in the main tank for any reason becomes clogged, and a pressure test as before described indicates that the screen is clogged, the screen, of course, can be removed for cleaning purposes by removing the manhole cover of the main tank. It is preferable however to clean the screen while it is in place and with the least disturbance of any of the parts. A pipe 61 extends from a point close to the bottom of the tank 55 upwardly through the head of said tank and thence to a pipe 62 which extends downwardly through the center of the manhole cover 14 of the main tank to a point above the center of the screen. The inner end of the pipe 62 carries a spray nozzle 63 which is positioned to spray a shower of oil upon the upper side of the screen so that the oil flows through the screen in a direction opposite to that in which it normally is carried by the gas. This shower of oil is sprayed against the screen under considerable pressure so that the force thereof will assist in dislodging any dirt which has clogged the screen.

With this arrangement, the gas in the main line under its operating pressure, can be utilized for the purpose. To accomplish this, the branch line valves are closed and the main line valve open so as to cut off the whole structure from the main line without interrupting the gas service in the line. A quantity of oil is then introduced into the measuring and filling tank 55 in a manner hereinbefore described, the valves 57 and 59 being normally closed. Gas is then taken from the main line and introduced under the pressure into the measuring and filling tank 55 through the filling opening 60. This is made convenient by the provisions of an independent tap 65 in the pipe line (Fig. 2) together with a valve 66 therefor, when the installation is made. A pipe may therefore be temporarily connected to said tap and to the filling opening 60 of the tank 55. By opening the valve 66 gas under pressure will thereby be admitted to the tank 55 and will force the oil upwardly through the pipe connections 61 and 62 to the spray nozzle and spray the oil violently against the upper side of the screen. Either or both of the taps 51 may be opened to relieve the pressure in the main tank during the cleaning operation.

After the screen has been thus cleaned, the temporary pipe from the tap 65 can be disconnected and the plug restored to the filler opening 60. The various valves can then be restored to their normal condition and the structure again cut into service.

In the event it is not desirable to use gas pressure for this purpose, air pressure from a suitable source outside of the system may be employed if desired. The same procedure may be carried out as just described, the source of air pressure being connected to the filler opening of the tank 55. If desired, however, the source of outside pressure can be introduced directly to the spray nozzle by connecting this source of air pressure to the pipe 62 outside of the tank, a T fitting 67 being provided for this purpose. In this way oil can be introduced to the main tank directly from a source of supply independent of the system. In any event, however, the cleaning operation can be quickly carried out without disassembling any of the parts of the structure.

It is obvious that changes may be made in the construction, operation and arrangement of the parts, without departing from the spirit of the invention, and I contemplate such changes as are fairly comprehended in the scope of the appended claims.

I claim:

1. In a structure of the class described, the combination of a main separating unit and an auxiliary separating unit and each comprising a drum, the main drum being disposed vertically and containing a body of oil and having a gas inlet, the auxiliary drum being disposed horizontally adjacent the upper end of the main drum, means connected with said gas inlet and projecting into the body of oil for introducing gas into said oil below the surface thereof, means connecting the auxiliary drum to a pipe line, a duct connecting said drums in series, and extending into the interior of the auxiliary drum and a baffle within said auxiliary drum adjacent the inner end of said duct for separating from the gas the fluid which is carried from said main drum.

2. In a structure of the class described, the combination of a tank having a gas inlet and containing a body of oil, a pipe connected with said inlet and adapted to introduce the incoming gas into the body of fluid, a screen in said tank above the fluid level through which the gas passes and adapted to separate impurities from the gas, means beyond the screen forming an outlet for the gas, an independent auxiliary drum having a baffle therein adjacent one end and a gas outlet at its opposite end, and a duct, connected with said tank and extending into the drum adjacent said baffle for directing the flow of gas against the baffle within said auxiliary drum.

3. In a structure of the class described, the combination of a main tank containing a body of oil and having a gas inlet, means within the tank connected to the inlet for introducing the incoming gas into the body of oil below the level thereof, filtering means in said tank through which the gas passes after leaving the body of oil for separating oil and impurities from said gas, means beyond the filtering means forming an outlet for the main tank, an auxiliary tank having a conduit member connected with said outlet and extending into the interior of said auxiliary tank, a baffle member in said auxiliary tank positioned adjacent the end of said conduit for separating impurities from the gas, and a pipe connection from said auxiliary tank to the first mentioned tank for conveying the said separated impurities to said first mentioned tank.

4. In a structure of the class described, the combination of a main tank containing a body of oil and having a gas inlet, means within the tank connected to the inlet for introducing the incoming gas into the body of oil below the level thereof, filtering means in said tank through which the gas passes after leaving the body of oil for separating oil and impurities from said gas, means beyond the filtering means forming an outlet for the tank, an auxiliary tank having a conduit member connected with said outlet and extending into the interior of said auxiliary tank, a baffle member in said auxiliary tank positioned adjacent the end of said conduit for separating impurities from the gas, a pipe connection from said auxiliary tank to the first mentioned tank for conveying the said separated impurities to said first mentioned tank, and a body of absorbent material in said auxiliary tank adjacent the baffle for collecting the separated impurities.

5. In a structure of the class described, the combination of a cylindrically formed drum disposed in vertical position and having an inlet in its side wall, a duct connected with said inlet and opening downwardly within the drum, said drum being adapted to contain a body of cleaning fluid the level of which is above the outlet end of said duct so that the incoming gas will bubble through said body of fluid, a filtering screen positioned above the level of the fluid and dividing the drum into upper and lower compartments, means forming an outlet from the upper compartment, a horizontally disposed auxiliary drum, a duct connected with said outlet and extending into the interior of the auxiliary drum, a vertical partition in said auxiliary drum dividing the drum into two compartments and disposed adjacent the inner end of said duct and having a foraminous member serving as a baffle for the gas emerging from said duct, a body of absorbent material adjacent said baffle in the compartment on the side of said partition opposite to the duct, and pipe connections extending from said absorbent material compartment to the first mentioned drum for conveying to the first mentioned drum impurities separated by the baffle in said auxiliary drum.

6. In a structure of the class described, the combination of a cylindrically formed drum disposed in vertical position and having an inlet in its side wall, a duct connected with said inlet and opening downwardly within the drum, said drum being adapted to contain a body of cleaning fluid the level of which is above the outlet end of said duct so that the incoming gas will bubble through said body of fluid, a filtering screen positioned above the level of the fluid and dividing the drum into upper and lower compartments, means forming an outlet from the upper compartment, a horizontally disposed auxiliary drum, a duct connected with said outlet and extending into the interior of the auxiliary drum, a vertical partition in said auxiliary drum dividing the drum into two compartments and disposed adjacent the inner end of said duct and having a foraminous member serving as a baffle for the gas emerging from said duct, a body of absorbent material adjacent said baffle in the compartment on the side of said partition opposite to the duct, pipe connections extending from said absorbent material compartment to the first mentioned drum for conveying to the first mentioned drum impurities separated by the baffle in said auxiliary drum, means extending into the upper compartment of said first mentioned drum for directing a spray of fluid under pressure against the upper side of the screen, and means for connecting said spray means with a source of fluid under pressure.

7. In a dirt trap for gas distribution lines, the combination of a vertically disposed tank having a pool of cleaning fluid at a given quiescent level and having a space above said level, means for introducing gas into the pool of fluid whereby the fluid will be violently agitated in said space; a screen member within said tank in position to intercept the fluid and impurities carried upwardly by the flowing gas, said screen being positioned in the space above the fluid level whereby its underside will be constantly washed by the violently agitated fluid in said space; a horizontally disposed auxiliary tank adjacent the upper portion of said first mentioned tank; a duct leading from the upper portion of said first mentioned tank above the screen and extending into the interior of the auxiliary tank; a baffle in said auxiliary tank against which the gas flowing from the duct impinges; and means forming an outlet for said auxiliary tank at a point distant from the end of said duct.

8. In a dirt trap for gas distribution lines, the combination of a vertically disposed tank having a pool of cleaning fluid at a given quiescent level and having a space above said level, means for introducing gas into the pool of fluid whereby the fluid will be violently agitated in said space; a screen member within said tank in position to intercept the fluid and impurities carried upwardly by the flowing gas, said screen being positioned in the space above the fluid level whereby its underside will be constantly washed by the violently agitated fluid in said space; a horizontally disposed auxiliary tank adjacent the upper portion of said first mentioned tank; a duct leading from the upper portion of said first mentioned tank above the screen and extending into the interior of the auxiliary tank; a baffle in said auxiliary tank against which the gas flowing from the duct impinges; a drain connection for said auxiliary tank from each side of said baffle; and means connecting said drain connection with the first mentioned tank below the fluid level therein for returning separated fluid from the auxiliary tank to the first mentioned tank.

9. In a dirt trap for gas distribution lines, the combination of a cylindrical main tank vertically disposed and having a pool of cleaning fluid at a given quiescent level and a chamber space above said level; a duct leading from the gas line into the main tank below the fluid level whereby the incoming gas will violently agitate the fluid and throw it upwardly in said chamber space; a horizontal screen in said chamber space above said fluid level in position so that the fluid will be thrown against the underside thereof and constantly wash the screen; a cylindrical auxiliary tank; horizontally positioned adjacent the upper end of said main tank, a duct leading from said main tank above the screen and extending through the end of said auxiliary tank and into the interior thereof; a vertical baffle positioned in said auxiliary tank adjacent the end of said duct; and means forming a gas outlet for said auxiliary tank at a point remote from the end of said duct.

10. In a dirt trap for gas distribution lines, the combination of a vertical tank vertically disposed and having a pool of cleaning fluid at a given quiescent level and a chamber space above said level; a duct leading from the gas line into the vertical tank below the fluid level whereby the incoming gas will violently agitate the fluid and throw it upwardly in said chamber space; a horizontal screen in said chamber space above said fluid level in position so that the fluid will be thrown against the underside thereof and constantly wash the screen; a cylindrical auxiliary tank horizontally positioned adjacent the upper end of said vertical tank; a duct leading from said vertical tank above the screen and extending through the end of said auxiliary tank and into the interior thereof; a vertical baffle positioned in said auxiliary tank adjacent the end of said duct; a drain connection from said auxiliary tank on each side of the baffle; and a pipe connecting said drain connections with the vertical tank below the fluid level for returning the separated fluid from the auxiliary tank.

HAROLD H. TOBIN.

CERTIFICATE OF CORRECTION.

Patent No. 1,992,586.                                                           February 26, 1935.

HAROLD H. TOBIN.

It is hereby certified that error appears in the printed specification of the above numbered patent requiring correction as follows: Page 5, second column, after line 35, insert the following as claim 11:

11. In the dirt trap of the class described, the combination of a vertically disposed main drum and a horizontally disposed auxiliary drum, each having a gas inlet and a gas outlet, the outlet of the main drum being connected to the inlet of the auxiliary drum, means within the main drum including a body of fluid therein for separating the impurities from the gas passing through said main drum, a vertically disposed baffle within the auxiliary drum for separating from the gas flowing therethrough the fluid contents thereof carried over from the main drum, and pipe connections leading from the auxiliary drum on both sides of said baffle to the main drum below said fluid level therein for draining the separated fluid from the auxiliary drum back into the main drum.

And that the said Letters Patent should be read withthis correction therein that the same may conform to the record of the case in the Patent Office.
Signed and sealed this 23rd day of April, A. D. 1935.

(Seal)                                                        Leslie Frazer
                                                             Acting Commissioner of Patents.